United States Patent [19]

Yoldas et al.

[11] Patent Number: 4,535,026

[45] Date of Patent: Aug. 13, 1985

[54] ANTIREFLECTIVE GRADED INDEX SILICA COATING, METHOD FOR MAKING

[75] Inventors: Bulent E. Yoldas, Churchill; Deborah P. Partlow, Wilkinsburg, both of Pa.

[73] Assignee: The United States of America as represented by the United States Department of Energy, Washington, D.C.

[21] Appl. No.: 509,118

[22] Filed: Jun. 29, 1983

[51] Int. Cl.³ .............................................. C03C 15/00
[52] U.S. Cl. .................................. 428/310.5; 156/625; 156/644; 156/662; 350/165; 427/165; 427/372.2; 427/374.2; 427/377; 427/379; 427/397.7; 428/312.6; 428/333; 428/428
[58] Field of Search ............. 350/165; 428/428, 312.6, 428/310.5, 333; 156/625, 644, 662; 427/162, 164, 165, 372.2, 374.2, 377, 379, 397.7

[56] References Cited

U.S. PATENT DOCUMENTS

| 4,019,884 | 4/1977 | Elmer et al. | 156/66.3 |
|---|---|---|---|
| 4,080,188 | 3/1978 | Doddato et al. | 65/30 R |
| 4,086,074 | 4/1978 | Minot et al. | 65/31 |

OTHER PUBLICATIONS

Journal of Non-Crystalline Solids, 51, pp. 105-121, (1982), "Introduction and Effect of Structural Variations in Inorganic Polymers and Glass Networks", by Yoldas.
Applied Optics, vol. 19, No. 7, pp. 1035-1038, (4/80), "Gradient-Index Optics: A Review," by Moore.
Journal Optical Society of America, vol. 66, No. 6, pp. 515-519, (6/76), "Gradient Refractive Index Antireflection Films Effective From 0.35 Micron to 2.5 Micron", by Minot.
Journal of Optical Society of America, vol. 51, No. 3, pp. 280-282, (3/61), "Reflectance of an Inhomogenious Thin Film", by Monaco.
Journal of the American Ceramic Society, vol. 6, No. 4, pp. 302-307, (4/83), "Development of Porous Antireflective Films on Borosilicate Glasses", by Iqbal et al.
Applied Physics Letter, 36 (11), pp. 891-893, (6/80), "Graded Index Antireflective Surfaces for High--Power Laser Application", by Lowdermilk et al.
Applied Optics, vol. 19, No. 9, pp. 1425-1429, (5/80), "Investigations of Porous Oxides as an Antireflective Coating for Glass Surfaces", by Yoldas et al.
Applied Optics, vol. 18, No. 18, pp. 3133-3138, (9/79), "Antireflective Coatings Applied from Metal-Organic Derived Liquid Precursors", by Yoldas et al.

Primary Examiner—George F. Lesmes
Assistant Examiner—P. R. Schwartz
Attorney, Agent, or Firm—W. D. Palmer

[57] ABSTRACT

Antireflective silica coating for vitreous material is substantially non-reflecting over a wide band of radiations. This is achieved by providing the coating with a graded degree of porosity which grades the index of refraction between that of air and the vitreous material of the substrate. To prepare the coating, there is first prepared a silicon-alkoxide-based coating solution of particular polymer structure produced by a controlled proportion of water to alkoxide and a controlled concentration of alkoxide to solution, along with a small amount of catalyst. The primary solvent is alcohol and the solution is polymerized and hydrolized under controlled conditions prior to use. The prepared solution is applied as a film to the vitreous substrate and rapidly dried. It is thereafter heated under controlled conditions to volatilize the hydroxyl radicals and organics therefrom and then to produce a suitable pore morphology in the residual porous silica layer. The silica layer is then etched in order to enlarge the pores in a graded fashion, with the largest of the pores remaining being sufficiently small that radiations to be passed through the substrate are not significantly scattered. For use with quartz substrates, extremely durable coatings which display only 0.1% reflectivity have been prepared.

14 Claims, 6 Drawing Figures

ANTIREFLECTIVE GRADED INDEX SILICA COATING, METHOD FOR MAKING

GOVERNMENT CONTRACT

The invention herein described was made in the course of or under a contract or subcontract with the Department of Energy.

CROSS REFERENCE TO COPENDING APPLICATION

Copending application Ser. No. 264,323, filed May 18, 1981 by B. E. Yoldas, one of the present applicants, discloses that metal oxide powders, including silicon dioxide, can be prepared by controlled hydrolization of the metal alkoxide which is thereafter sintered to the oxide. By controlling the degree of hydrolization of the alkoxide, the sintering and densifying characteristics of the resulting metal oxide powder can be predetermined.

BACKGROUND OF THE INVENTION

This invention relates to antireflective (AR) coatings for vitreous substrates and, more particularly, to such antireflective coatings which are graded in porosity in order to be effective over a wide band of radiations, a coating solution for applying the antireflective coating, and a method for making the antireflective coating.

The subject of gradient-index optics apparently dates back to the 1850's and is summarized in article entitled "Gradient-Index Optics: A Review" by Moore, Applied Optics, Volume 19, No. 7, April 1980, pgs. 1035–1038. In an article entitled "Single-Layer, Gradient Refractive Index Antireflection Films Effective From 0.35 Micron To 2.5 Micron" by Minot, Journal Optical Society of America, Vol. 66, No. 6, June 1976, pgs. 515–519 is reported so-called phase separable glasses wherein alkali borosilicate glass is heated to a relatively high temperature to cause it to separate into phases, with the surface portion thereof then etched to selectively dissolve portions of the phase-separated material to leave a residual skeletal layer made up largely of silica. Various patents describe this development, such as U.S. Pat. No. 4,019,884 dated Apr. 26, 1977 to Elmer and Walters and U.S. Pat. No. 4,086,074 dated Apr. 25, 1978 to Minot et al. A further improvement for such a coating is set forth in U.S. Pat. No. 4,080,188 dated Mar. 21, 1978 wherein the etched material is thereafter heated again to cause the substrate to become homogeneous.

The theoretical and mathematical analyses of such thin films are outlined in article entitled "Reflectance Of An Inhomogeneous Thin Film" by Monaco, Journal of the Optical Society of America, Vol. 51, No. 3, March 1961, pgs. 280–282. A further analysis of these porous antireflective films is set forth in article entitled "Development Of Porous Antireflective Films On Borosilicate Glasses" by Iqbal et al., Journal of the Am. Ceramic Soc., Vol. 66, No. 4, pgs. 302–207 (1983). Particular attention is directed to FIG. 1 of the Iqbal reference which illustrates in schematic form the graded refractive index which occurs between the air-layer interface and between the layer-glass interface which results from the graded porosity. Apparently the alkali borosilicate glasses of Minot et al. cannot be used with high power lasers. This is discussed in article entitled "Graded-Index Antireflection Surfaces For High-Power Laser Applications" by Lowdermilk et al, Applied Physics Letter 36 (11), June 1980, pages 891–893.

The deposition of porous oxides from metal-organic derived precursors as antireflective coatings is described in article entitled "Investigations Of Porous Oxides As An Antireflective Coating For Glass Surfaces" by Yoldas, Applied Optics, Vol. 19, No. 9, May 1980, pgs. 1425–1429. These coatings are not graded. The preparation of mixed titania-silica antireflecting coatings from mixed alkoxides is disclosed in article entitled "Antireflecting Coatings Applied From Metal-Organic Derived Liquid Precursors" by Yoldas et al., Applied Optics, Vol. 18, No. 18, September 1979, pages 3133–3138.

The controlled hydrolysis and polymerization of silicon alkoxides by varying the parameters of preparation is disclosed in article entitled "Introduction And Effect Of Structural Variations In Inorganic Polymers And Glass Networks" by Yoldas, Journal of Non-Crystalline Solids, 51 (1982), pgs. 105–121.

SUMMARY OF THE INVENTION

There is provided a radiation-transmitting vitreous substrate which has coated on at least one surface a substantially non-reflecting coating which functions effectively over a predetermined wide band of radiations. The coating comprises a single silica layer having a thickness which falls within the range of from about 150 nm to 600 nm, with the layer displaying throughout its thickness at least some degree of porosity. All of the layer consists essentially of silica except for other glass forming constituents which may diffuse from the coated substrate and into the silica layer proximate the layer-substrate interface during the forming-processing of the silica layer on the substrate. That portion of the silica layer which is immediately proximate the exposed surface thereof displays the highest degree of porosity and its index of refraction approaches that of air. The porosity of the silica layer gradually decreases from the exposed surface thereof to a depth which is at least about one-quarter of the longest wavelength of the wide band of radiations under consideration, in order to provide a graded degree of porosity, and the portion of the silica layer which is immediately proximate the interface between the silica layer and the substrate has an index of refraction which approaches that of the substrate. The sizes of the individual pores in the silica layer are sufficiently small that radiations impinging upon the exposed surface of the silica layer are transmitted therethrough without being significantly scattered.

There is also provided a coating solution for applying the thin coating with the solution comprising a predetermined molar amount of silicon alkoxide, water in amount from about 1.0 moles to about 2.6 moles per mole of alkoxide, organic solvent in which both the alkoxide and the water are miscible and in such amount that the total silicon alkoxide when expressed in terms of equivalent silica content is from about 12% to about 18% by weight of the coating solution, together with a small amount of mineral acid which functions as a catalyst. The coating solution in a final step of preparation is heated and then cooled under predetermined conditions to effect a controlled hydrolysis and polymerization thereof.

In preparing the antireflecting coating, the coating solution is applied as a generally uniform liquid film and rapidly dried under low humidity conditions to form a residual layer having a thickness of from about 300 nm to about 1200 nm. This thin layer is then heated at a relatively high predetermined temperature in order to drive residual organic material and hydroxyl radicals therefrom and then to further heat treat the residual silica to form a thin layer consisting essentially of porous silica, except for any minor proportion of glass-forming constituents which may have diffused from the substrate into the layer-substrate interface during the heating thereof. There is then applied to the exposed surface of the formed silica layer a relatively weak silica etching solution in order to grade the existing pores in the porous silica layer to a depth, measured from the exposed surface, which is at least about one-quarter of the longest wavelength of radiations which are to be transmitted. Again, after etching the size of the largest pores in the silica layer still remains sufficiently small so as not to significantly scatter any radiations intended to be passed through the substrate. After etching, the porous silica layer is rinsed and then dried.

BRIEF DESCRIPTION OF THE DRAWINGS

For a better understanding of the invention, reference may be had to the preferred embodiments, exemplary of the invention, shown in the accompanying drawing, in which.

DESCRIPTION OF THE PREFERRED EMBODIMENTS

Figure 1:
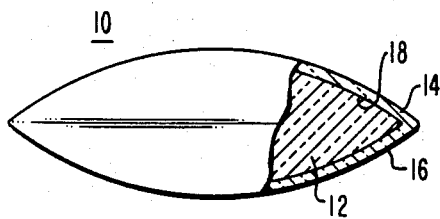
FIG. 1 is a side elevational view, shown partly in section, of an optical lens which is coated with the present AR coating.

In FIG. 1 is shown an optical lens of double convex configuration which comprises a radiation-transmitting, non-porous, vitreous substrate 12 of predetermined refractive index having coated on at least one surface thereof a substantially non-reflecting coating 14 which functions effectively over a predetermined wide band of radiations. In the case of applications for focusing the radiations of a high power laser, the substrate 12 can be fabricated of quartz with a diameter of 90 cm. In the case of other applications such as cameras, the substrate 12 can be fabricated of optical glass and the present coating 14 will work effectively with any such vitreous substrate.

The single silica layer 14 which is coated onto the substrate 12 has an exposed surface 16, with the thickness of this silica layer as measured between the exposed surface 16 and the silica layer-substrate interface 18 being generally uniform and in the range from about 150 nm to about 600 nm. The silica layer 14 displays throughout its thickness at least some degree of porosity. All of the silica layer 14 consists essentially of silica except for other glass-forming constituents which may diffuse from the substrate 12 and into the silica layer 14 proximate the layer-substrate interface 18 during the forming-processing of the silica layer. That portion of the silica layer 14 which is immedately proximate the exposed surface 16 displays the highest degree of porosity and the porosity of the silica layer gradually decreases from the exposed surface 16 to a depth which is at least about one-quarter of the longest wavelength of the predetermined wide band of radiations to be utilized, in order to provide a graded degree of porosity which decreases as the distance from the exposed surface 16 increases. As a specific example, if the longest radiations to be transmitted have a wavelength of 700 nm, the porosity of the layer is graded to a depth of at least 175 nm. That portion of the layer 14 which is immediately proximate the exposed surface 16 has an index of refraction which approaches that of air, i.e., unity. That portion of the silica layer which is immediately proximate the interface 18 has an index of refraction which approaches that of the substrate 14. In this regard, the graded index of refraction is similar to the schematic representation at page 302 of the Iqbal et al. reference outlined in the Background Section, see FIG. 1 thereof. In all cases, the sizes of the individual pores in the silica layer 14 are sufficiently small that radiations impinging thereon are transmitted therethrough without being significantly scattered.

The transmission of light through an atmosphere containing small particles or, alternatively, the transmission of light through a solid which contains minute pores is highly complex and includes the relationship of the sixth power of the radius of the particles or pores divided by the fourth power of the wavelength of light being considered. With respect to the present AR coatings, however, the largest of the pores which have been obtained are significantly small that no measurable scattering has been detected. In other words, any radiations which impinge upon the exposed surface 16 of the silica layer 14 are transmitted therethrough without being significantly scattered, although some negligible amount of scattering may be present because of the nature of the phenomenon. The requirements of a wide-spectrum AR coating thus include a pore morphology which encompasses a high degree of porosity coupled with a grading of the degree of porosity coupled with the requirement that the pores are sufficient small that the radiations to be transmitted are not scattered.

As indicated hereinbefore, in the case of a quartz lens as used to focus a high power laser, both surfaces of the lens are coated with the present AR silica coating. The same general principles would normally apply to any optical lens or lens system wherein the glass-air interfaces would normally carry the present AR coating. In the case the optical glass includes glass-forming constituents which are relatively mobile under high temperature conditions, such as the alkali metal oxides, a small amount of the alkali metal can diffuse into the silica layer 14 proximate the interface 18 during the forming-processing thereof, as will be described hereinafter. Such alkali metal diffusion serves to enhance the diffusion bonding of the AR coating and, in addition, it serves to help grade the index of refraction, especially in the case of a high-index optical glass. As a specific example, quartz has an index of refraction of 1.47 and the applied AR coating is tailored during its application so that it essentially grades the index between air and that of the quartz. Optical glasses have a higher index such as 1.53–1.72 or higher, and the present AR coating essentially serves the same function.

Figure 2:
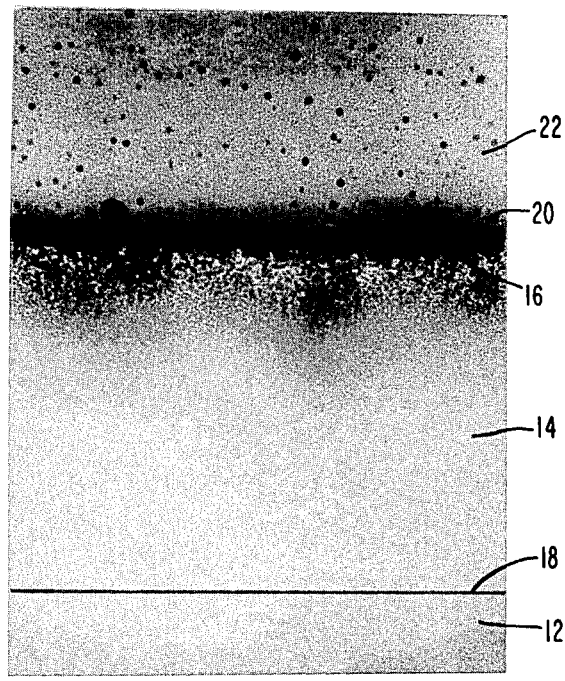
FIG. 2 is an electron micrograph taken at 150,000× of a cross section of the present porous silica layer, including a small section of the substrate.

In FIG. 2 is shown an electron micrograph taken at 150,000× of the present AR coating 14. In this electron micrograph, the dark-appearing solid material 20 should be ignored as it constitutes vacuum-metalized aluminum which was utilized to mark the exposed surface of the AR film. In similar fashion, the layer 22 overlying the aluminum 20 is epoxy resin which was used as a mounting device for taking the electron micrograph. Considering FIG. 2 in more detail, the silica layer-substrate interface 18 has been accentuated as a dark line with only a portion of the substrate 12 being shown. In this embodiment, the measured thickness of the layer 14 is of the order of 365 nm. While the layer 14 is porous throughout, the extreme degree of porosity is only apparent in the upper portions thereof which are those portions nearest to the exposed surface 16 thereof.

Figure 3:
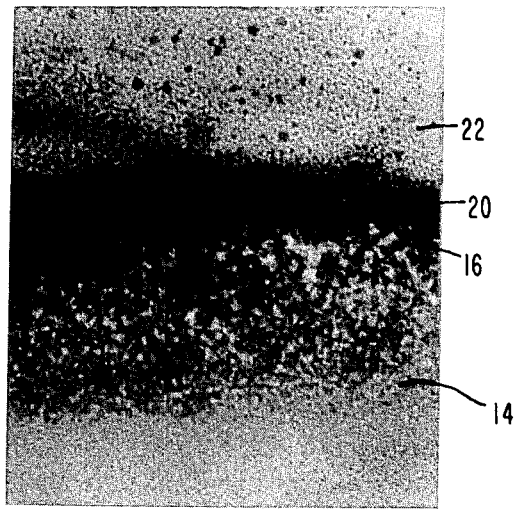
FIG. 3 is another photomicrograph taken at 330,000× showing a small cross-sectional portion of the present porous silica layer.

In FIG. 3 is shown an electron micrograph similar to that as shown in FIG. 2 except that the magnification is 330,000 in order to show the porosity of the silica layer 14, particularly in those regions of the layer which are nearer to its exposed surface 16.

Figure 4:
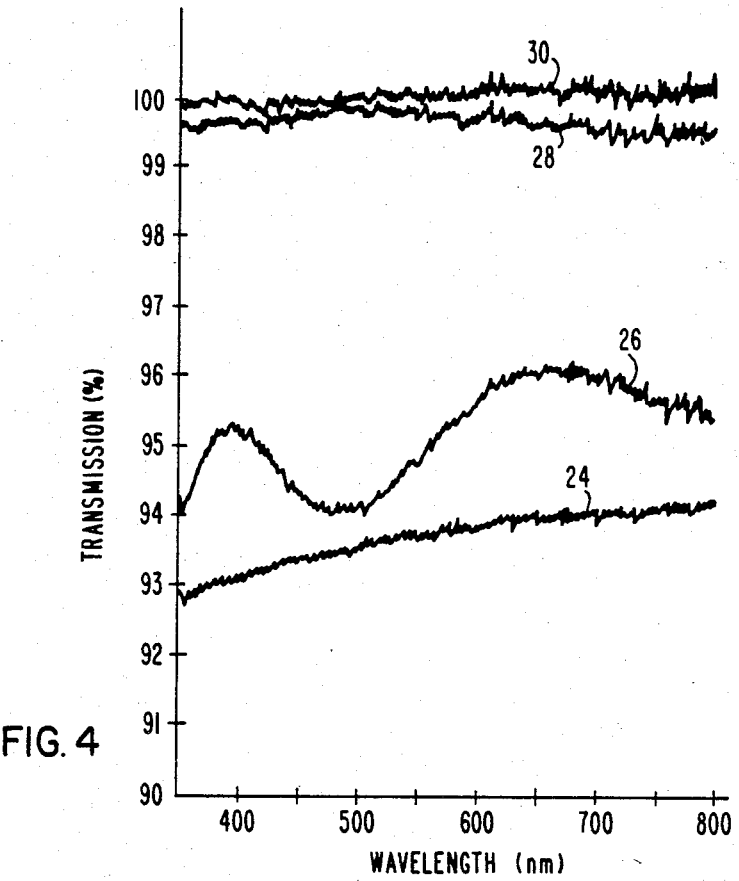
FIG. 4 is a graph of transmission in percent versus wavelength in nanometers showing the broad-band antireflective characteristics of the present coating as applied to quartz.

In FIG. 4 are shown the performance characteristics of the coating together with the improvements which are obtained in transmission. Starting at a wavelength of 350 nm and extending through 800 nm, the transmission is shown for light passing through a quartz member. It should be understood that this includes two airsubstrate interfaces both of which introduce their own individual losses. The transmission through the uncoated member is set forth by the curve designated 24. The curve designated 26 sets forth the transmission characteristics for a quartz member coated on both sides with a silica layer which has been deposited in accordance with the present invention except that the final etching process, as described in detail hereinafter, was omitted. As shown, the transmission is only slightly improved and varies considerably with wavelength. The performance of the coating after etching and completion in accordance with the present invention is shown by the curve designated 28 and that is compared to the standard of transmission through air is represented by the curve 30. To date, the best AR coatings on quartz prepared in accordance with the present invention display a transmission of about 99.9% through one surface thereof with the total transmission through a double coated member being approximately 99.8%. Not only is this very high, but the coating can function effectively over a wide band of radiations, extending from approximately 250 nm all the way up to one micron and even longer.

In order to apply the present coating, there is first prepared a coating solution having a controlled polymer network which can be applied to the vitreous substrate and which can be converted to a thin silica coating having controllable sintering properties and controllable porosity. The coating solution comprises a predetermined molar amount of silicon alkoxide of the formula $Si(OR)_4$ where R is alkyl having from one to six carbon atoms, water in amount of from about 1.9 moles to about 2.6 moles per mole of alkoxide, organic solvent in which both the alkoxide and the water are miscible and in such amount that the total silicon alkoxide, when expressed in terms of equivalent $SiO_2$ content, is from about 12% to about 18% by weight of the coating solution, together with a small amount of mineral acid which functions as a hydrolysis/polymerization catalyst. This coating solution in a final step of preparation is heated and then cooled under predetermined conditions in order to effect a controlled hydrolysis and polymerization thereof. As a specific example, to prepare 750 kilograms of a solution, 416 kilograms of silicon ethoxide is mixed with 255 kilograms of ethyl alcohol, 79 kilograms water and 35 grams of 70% nitric acid catalyst. In the preferred mode of preparation, the alcohol, water and catalyst are first mixed and the ethoxide rapidly added thereto. After thorough mixing, the resulting solution is heated to a temperature of 50° to 55° C. for approximately 16 hours and it is then allowed to digest at room temperature. The heating which is performed after the mixing serves to effect a controlled hydrolysis and polymerization of the mixture.

It has previously been demonstrated that silica deposited from silanol solutions, although initially porous, tends to sinter to a dense film at pyrolysis temperatures such as 400° to 500° C. Such dense, single-phase coatings are lacking in antireflective properties and, in addition, cannot be etched to produce the porosity which is required for an AR coating. It has also been known that molecular-structural variations introduced during hydrolysis and polymerization of alkoxides significantly modify the sintering behavior of the resulting materials. In accordance therewith, films which are deposited from solutions with low hydrolysis water do show a resistance to sintering by retaining their porosity. However, with low water of hydrolysis another problem develops in that the solutions which deposit sintering-resistant, porous $SiO_2$ have poor wetting behavior on glass surfaces and this behavior worsens as the hydrolysis water decreases. In accordance with the present invention, there has been discovered a "window" wherein the hydrolysis water is high enough to allow a good coating as well as to provide suitable branched polymers, but low enough to prevent sintering. This corresponds to an amount of hydrolysis water of from about 1.9 moles to about 2.6 moles per mole of alkoxide, with the preferred concentration being from about 2 moles to about 2.3 moles of water per mole of alkoxide. As a general rule, if dip coating is used and near UV transmission needed, a slightly higher water of hydrolysis is desirable.

As an additional limitation, since the water is limited, the percent by weight of alkoxide which can be used is limited by the total amount of organic solvent such as ethanol. It has been found that the total silicon alkoxide, when expressed in terms of equivalent $SiO_2$ content, should be from about 12% to about 18% by weight of the coating solution. The relative concentration of the reacting species determines the molecular spacing during the hydrolysis-polymerization reaction and thus affects the structure and morphology of the deposited film. If less than about 12% by weight of alkoxide is used, the resulting coatings will not be satisfactory. With respect to the acid catalyst, any mineral acid can be used and nitric or hydrochloric are preferred. The preferred range for alkoxide content is from about 14% to about 17% equivalent $SiO_2$ by weight of the coating solution. This corresponds to 48%–59% silicon ethoxide.

The final step of heating and then cooling in order to effect the controlled hydrolysis and polymerization is typically conducted at from about 40° to about 65° for a period of from about 16 hours to about 24 hours, and the solution is then permitted to cool to room temperature.

After cooling, the solution preferably is permitted to remain at room temperature.

To apply the coating solution as a liquid film to a substrate, the temperature preferably should be about 70° to 72° F. The temperature affects the viscosity of the solution and thus the thickness. As an example, the viscosity of the solution is about 2.8 cps at 20° C. and 2.4 cps at 25° C. A 5° C. difference in the solution temperature can vary the deposited coating thickness by about 7 to 10 nm. The coating can be applied by any conventional technique such as dipping or immersing and pulling or draining. Typically the thickness of the resulting coating is proportional to the square root of the pull rate, with a representative pull rate being 3 to 11 cms. per minute and preferably about 6 to 9 cms. per minute. Films thickner than about 1200 nm deposited on quartz with a pull rate greater than about 11 cm/min tend to display some degree of crazing after heat treatment. Films deposited with a pull rate of less than about 3 cm/min tend to be too thin. After the coating is applied, it is rapidly dried under low humidity conditions to form a residual somewhat porous layer which has a thickness of from about 300 nm to about 1200 nm. The applied coating should be rapidly dried to prevent sagging and if the coating is dried under high humidity conditions, the porosity in the dried coating decreases, which is undesirable.

Figure 5:
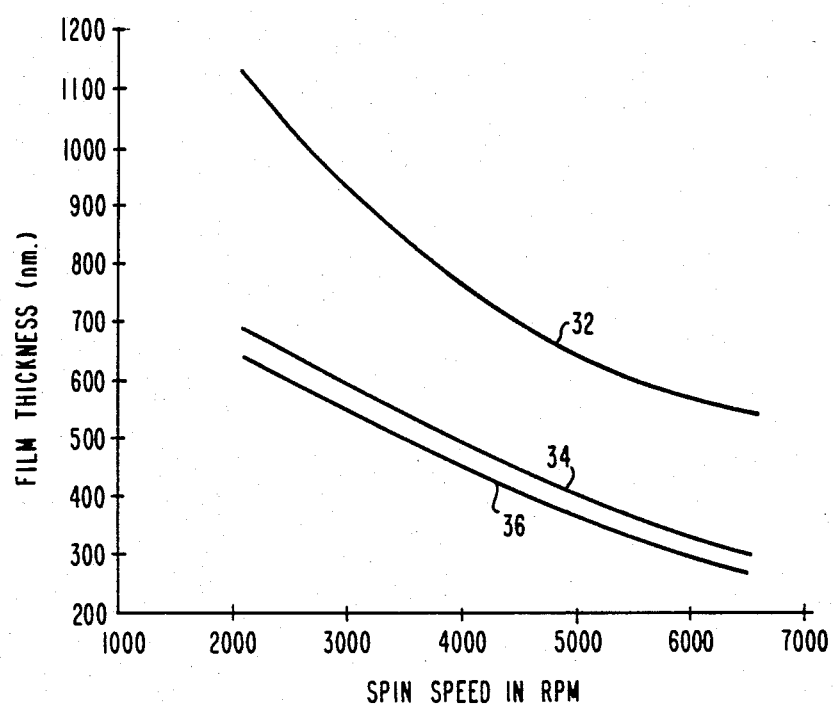
FIG. 5 is a graph of film thickness in nanometers versus spin speed showing the resulting thickness of the film in various stages of preparation and treatment, as applied by a spinning technique.

The coating can also be applied by a spinning technique and in FIG. 5 is shown a graph of film thickness in nanometers versus spin speed in rpm for coating a two-inch diameter, optically polished quartz member. The film as coated has approximately twice the thickness of the coated film after heat treating and etching. When coating a large member such as a quartz lens, it is preferred to use a draining technique for applying the liquid film.

After the coating is dried, the substrate and the coated layer are promptly heated at a predetermined temperature and for a predetermined time first to drive residual organic material and hydroxyl radicals therefrom and then to tailor the pore size in the residual silica to form a thin layer consisting essentially of porous silica, except for any minor portion of glass-forming constituent which may diffuse from the substrate during the heating thereof into the porous silica layer 14 proximate the silica layer-substrate interface 18. This formed layer will be porous throughout its thickness but its performance as an AR coating will be relatively poor, since pores have yet to be graded, see curve 26 in FIG. 4. The heating step can vary somewhat depending on the alkoxide used and method of application and the spectral region in which the coating is to operate. As a general rule, higher heat treatment temperatures and longer times are required for those deposition techniques which use solutions of low-water hydrolysis. For operating with radiations in the range of from 350 nm to 1 nm, a solution incorporating 2.2 moles of water per mole of alkoxide and which is applied by dip or drain coating on quartz, a heat treatment of two to four hours at 500° C. provides good results. If spin coating application is used to apply the coating, with the water to alkoxide molar ratio being 2, a preferred heating treatment is 585° C. for 16 hours because of the lower water ratio. For coating other glasses such as soda-lime-silica glass, a water to alkoxide molar ratio higher than 2.2 may be used and it is applied by dip coating, with the heat treatment being 400° C. for one to three hours. As a general rule, the heat treatment is at a temperature of from about 400° C. to 600° C. for a sufficient time to produce a suitable pore size and morphology for grading. As indicated hereinbefore, the formed silica layer after the initial heating step will be porous throughout, but the pores will not be graded and the performance of this layer as an antireflecting coating will be relatively poor. The foregoing heat treatment will normally cause the thickness of the applied and dried coating to shrink by about one half. Thus if the dried coating applied by spinning is 1200 nm thick, its thickness after heat treatment will be about 600 nm. Final AR coatings which have a thickness greater than about 600 nm will display some tendency to craze.

The longest wavelength of the radiations intended to be transmitted is also a factor to be considered is applying the coating solution to the substrate. For example, if the longest radiations to be transmitted have a wavelength of 1,000 nm, the applied solution as dried should have a thickness of at least 500 nm which will shrink upon heat treatment and etching. Preferably the applied solution as dried should have a thickness somewhat greater than this indicated figure of 500 nm for such an application. For transmitting radiations of shorter wavelengths, such as a wavelength range of from 300 nm to 500 nm, the coating solution as applied and dried can be thinner.

In the next step of preparation, there is applied to the exposed surface 16 of the porous silica layer a relatively weak etching solution for a predetermined time sufficient to enlarge in a graded fashion the existing pores in the porous silica layer to a depth, measured from the exposed surface 16, which is at least about one-quarter of the longest wavelength of radiations of the predetermined wide band of radiations to be accommodated, in order to provide a graded degree of porosity. As a specific example, for etching a 90 cm quartz lens, the lens is immersed in a 0.075% hydrofluoric acid (48% conc) for 18 minutes. For example, the acid solution is prepared by adding 7.5 grams of 48% HF solution to 10 kilograms water. As a specific example, the etching temperature is in the range of 67 to 70 degrees F., with the lens cooled to approximately 70° F. prior to etching. If the temperature is higher, then the etching period should be shortened somewhat. As a specific example, when etching at 70° F., if the etching solution concentration is increased from the indicated 0.075% to 0.1%, the etching time is decreased to 9 minutes. If the etching solution is diluted to 0.05%, then the etching time is increased to 38 minutes. This etching operates to grade the pore size as indicated hereinbefore and as shown in the photomicrographs of FIGS. 2 and 3. In any case, the size of the largest pores in the silica layer is sufficiently small so as not to significantly scatter any of the radiations which are intended to be passed through the substrate 12. After the etching, the coated substrate is rinsed thoroughly with water and then dried. When coating a large quartz lens for use with high-power lasers or when coating precision optical members, it is preferable to conduct all operations in a clean room. In addition, all solutions used in the coating operation should be filtered.

As a further example, 36 g of water, 156 g dry ethanol and 5 drops of 70% conc nitric acid (0.175 g) are mixed. To this is rapidly added 208 g silicon tetraethoxide and exothermic heating occurs. The resulting solution is maintained at 60° C. for twenty-four hours in a closed container, after which it is permitted to cool to room temperature. This coating composition contains an equivalent of 15% by weight of silica. A 5 cm diameter optically polished quartz disc has the coating composition deposited thereon by a spin technique at 3500 rpm. The disc is then transferred to an oven and heated from room temperature to 585° C. with the heating maintained for 16 hours. This will shrink the pore size for transmission throughout the range of 350 nm to 1000 nm. After cooling, the disc is immersed in an etching solution consisting of 2000 g of water and 1.5 g of 48% HF, with the etching solution at 20° C., and the disc is etched for 18 minutes. The disc is then rinsed with water and dried. The finished sample displays a transmission greater than 99% throughout the entire indicated spectrum.

As another example, for dipping application, 79.2 g of water, 255 g of dry ethanol and 10 drops of 70% nitric acid (0.35 g) are mixed. To this is rapidly added 416 g of silicon tetraethoxide and exothermic heating occurs. This solution has 2.2 moles of water per mole of alkoxide and the silica equivalent constitutes 16% by weight of the coating composition. The solution is heated at 60° C. for twenty-four hours and then cooled to room temperature. An optically polished quartz plate is immersed in the solution and pulled out at a rate of 8 cm/min in an atmosphere of 30% humidity air. The coated sample is heated in an oven at 500° C. for four hours, and then cooled to room temperature. The heat-treated plate is then placed in a pore-grading etching solution made of 1.5 g of 48% HF in 2000 g water and etched for a period of 18 minutes. After etching, the sample is rinsed with water and dried. The measured transmission for this sample indicates a 99.5% transmission throughout the range of 300 nm to 1100 nm. It has been found that solutions produced by higher hydroxyl water and applied by dip coating provide somewhat better performance with respect to transmission in the near U.V. than the spin-coated-applied samples.

The heating step for the coated substrate which first drives off the organics and hydroxyl groups will vary considerably depending upon the vitreous member being coated and the coating composition used. As a general rule, this heating will fall within the range of from about 400° C. to 600° C. for a period of from about 1 hour to about 16 hours. When coating soda-lime-silica glass, the strain point temperature of the glass should not be exceeded.

The etching solution can be varied and preferably includes HF in a concentration equivalent to 7.5 grams of 48% HF diluted with water in amount of from about 7.5 kg to about 15 kg, with the etching time varying from about 8 minutes to about 40 minutes, with the weaker the etching solution, the longer the etching time. Any suitable silica etch may be substituted for the indicated hydrofluoric acid such as solutions containing $NH_4F \cdot HF$ and other suitable silica etching solutions may be substituted therefore. The final graded AR coating will display performance generally as represented by the curve 28 shown in FIG. 4.

While silicon tetraethoxide is the preferred alkoxide, other alkoxides can be substituted therefor. Also, other organic solvents such as higher and lower alcohols can be substituted for the preferred ethanol. It is possible that added surfactants or dispersing agents may be beneficial in preparing the coating compositions, although these have not been found necessary in the foregoing examples.

Figure 6:
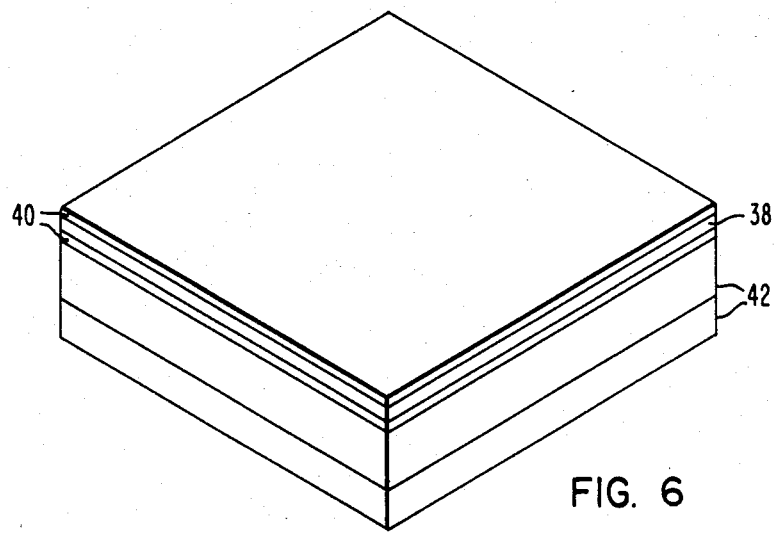
FIG. 6 is an isometric view of a glass protective member coated with the present AR film as it might be used in typical applications.

Any glass or vitreous material may be utilized as the substrate and soda-lime-silica glass or borosilicate glass can be used either in curved or flat form and coated on either one or both sides with the present AR coating. In FIG. 6 is shown a protective glass cover 38 with an AR coating 40 on both sides thereof. This cover 38 is used with an operable member 42 which is only diagrammatically represented, but which can be a solar cell or a photovoltaic generator, for example. The glass cover 38 when coated on both sides with the present AR coating 40 will display an increased transmissivity of approximately 8% as compared to uncoated glass, with a 4% gain being realized at each glass interface.

We claim:

1. A radiation-transmitting non-porous vitreous substrate of predetermined refractive index having coated on at least one surface thereof a substantially non-reflecting coating which functions effectively over a predetermined wide band of radiations, said non-reflecting coating comprising:
   a single silica layer overcoated on said non-porous substrate and having an exposed surface, the thickness of said silica layer as measured between the exposed surface thereof and the silica layer-substrate interface being generally uniform and in the range of from about 150 nm to about 600 nm with the silica layer displaying throughout its thickness at least ome degree of porosity, and the porosity of said overcoated silica layer together with the non-porous nature of said substrate forming a defined interface therebetween;
   all of said silica layer consisting essentially of silica except for other glass-forming constituents which may diffuse from said substrate and into said silica layer proximate said layer-substrate interface during the forming-processing of said silica layer on said substrate;
   that portion of said silica layer which is immediately proximate the exposed surface thereof displaying the highest degree of porosity and the porosity of said silica layer gradually decreasing from the exposed surface thereof to a depth which is at least about one-quarter of the longest wavelength of said predetermined wide band of radiations to provide a graded degree of porosity which decreases as the distance from the exposed surface thereof increases;
   that portion of said silica layer which is immediately proximate the exposed surface thereof having an index of refraction which approaches unity, and that portion of said silica layer which is immediately proximate the interface between said silica layer and said substrate having an index of refraction which approaches that of said substrate; and
   the size of the individual pores in said silica layer being sufficiently small that radiations impinging upon the exposed surface of said silica layer are transmitted therethrough without being significantly scattered.

2. The coated substrate as specified in claim 1, wherein said substrate is lens means fabricated of quartz, and those surfaces of said lens means through which radiations are adapted to enter and exit and which comprise an abrupt change in refractive index are coated with said silica layer.

3. The coated substrate as specified in claim 1, wherein said substrate is optical glass fabricated in the form of lens means, and said single silica layer is coated on those air and lens means interfaces through which radiations are intended to enter and exit.

4. The coated substrate as specified in claim 3, wherein said optical glass include alkali metal oxide as a constituent thereof, and during the forming-processing of said silica layer, a small amount of said alkali metal diffuses into said silica layer proximate said layer-substrate interface.

5. The coated substrate as specified in claim 1, wherein said substrate is one of borosilicate glass and soda-lime-silica glass.

6. The coated substrate as specified in claim 1, wherein said coated substrate has two surfaces and forms a protective cover for a photovoltaic generator, and said silica layer is applied to both surfaces of said protective cover.

7. The coated substrate as specified in claim 1, wherein said coated substrate has two surfaces and serves as a cover member for a solar collector, and said silica layer is carried over both surfaces of said cover member.

8. The method of applying to a radiation-transmitting non-porous vitreous substrate of predetermined refractive index a substantially non-reflecting coating which functions effectively over a predetermined wide band of radiations, which method comprises:

preparing a coating solution comprising a mixture of a predetermined molar amount of silicon alkoxide of the formula $Si(OR)_4$ where R is alkyl having from one to six carbon atoms, water in amount of from about 1.9 moles to about 2.6 moles per mole of alkoxide, organic solvent in which both said alkoxide and said water are miscible and in such amount that the total silicon alkoxide when expressed in terms of equivalent $SiO_2$ content is from about 12% to about 18% by weight of said coating solution, and a small amount of mineral acid catalyst, and heating and then cooling the mixed solution constituents under predetermined conditions to effect a controlled hydrolysis and polymerization thereof;

applying the prepared coating solution to the substrate to be coated as a generally uniform liquid film, and rapidly drying the applied film under low humidity conditions to form a residual layer having a thickness of from about 300 nm to about 1200 nm;

heating the substrate and the coated layer at a predetermined temperature and for a predetermined time first to drive residual organic material and hydroxyl radicals therefrom and then to heat treat the residual silica to form a thin layer consisting essentially of porous silica except for any minor proportion of glass-forming constituent which may diffuse from the substrate during the heating thereof into the porous silica layer proximate the silica layer-substrate interface, with the size of the individual pores of said porous silica layer being sufficiently small that radiations intended to pass through said substrate are not significantly scattered by the pores in said porous silica layer; and applying to the exposed surface of said formed porous silica layer a relatively weak silica etching solution for a predetermined time sufficient to enlarge in a graded fashion the existing pores in the porous silca layer to a depth, measured from the exposed surface, which is at least about one-quarter of the longest wavelength of radiations of said predetermined wide band of radiations to provide a graded degree of porosity which decreases as the distance from the exposed surface of said silica film increases, with the size of the largest pores in said silica layer being sufficiently small so as not to significantly scatter the radiations intended to be passed through said substrate.

9. The method as specified in claim 8, wherein said silicon alkoxide is silicon ethoxide, water is present in amount of from about 2 moles to about 2.3 moles per mole of alkoxide, said organic solvent is ethanol, present in such amount that the total silicon ethoxide when expressed in terms of equivalent $SiO_2$ content is from about 14% to about 17% by weight of said coating solution, and said mineral acid is nitric acid or hydrochloric acid.

10. The method as specified in claim 9, wherein said final step of heating and then cooling the coating solution includes heating the mixed coating solution constituents to a temperature of from about 40° C. to about 65° C. for a period of from about 16 hours to about 24 hours, and then permitting the solution to cool to room temperature.

11. The method as specified in claim 9, wherein immediately after said coating solution has been applied to said substrate and then dried, said substrate and the coated layer are heated to a temperature of from about 400° C. to about 600° C. for a period of from about 1 hour to about 16 hours.

12. The method as specified in claim 9, wherein said etching solution includes HF in a concentration equivalent to 7.5 grams of 48% HF diluted with water in amount of from about 7.5 kg to about 15 kg, with the etching time being from about 8 minutes to about 40 minutes, with the weaker the etching solution, the longer the etching time.

13. The method as specified in claim 9, wherein after etching, the resulting silica layer is rinsed and dried.

14. A radiation-transmitting non-porous vitreous substrate of predetermined refractive index having coated on at least one surface thereof a substantially non-reflecting coating which functions effectively over a predetermined wide band of radiations, said non-reflecting coating having been prepared by the method which comprises:

preparing a coating solution comprising a mixture of a predetermined molar amount of silicon alkoxide of the formula $Si(OR)_4$ where R is alkyl having from one to six carbon atoms, water in amount of from about 1.9 moles to about 2.6 moles per mole of alkoxide, organic solvent in which both said alkoxide and said water are miscible and in such amount that the total silicon alkoxide when expressed in terms of equivalent $SiO_2$ content is from about 12% to about 18% by weight of said coating solution, and a small amount of mineral acid catalyst, and heating and then cooling the mixed solution constituents under predetermined conditions to effect a controlled hydrolysis and polymerization thereof;

applying the prepared coating solution to the substrate to be coated as a generally uniform liquid film, and rapidly drying the applied film under low humidity conditions to form a residual layer having a thickness of from about 300 nm to about 1200 nm;

heating the substrate and the coated layer at a predetermined temperature and for a predetermined time first to drive residual organic material and hydroxyl radicals therefrom and then to heat treat the residual silica to form a thin layer consisting essentially of porous silica except for any minor proportion of glass-forming constituent which may diffuse from the substrate during the heating thereof into the porous silica layer proximate the porous silica layer-substrate interface, with the size of the individual pores of said porous silica layer being sufficiently small that radiations intended to pass through said substrate are not significantly scattered by the pores in said porous slica layer; and applying to the exposed surface of said formed porous silica layer a relatively weak silica etching solution for a predetermined time sufficient to enlarge in a graded fashion the existing pores in the porous silica layer to a depth, measured from the exposed surface, which is at least about one-quarter of the longest wavelength of radiations of said predetermined wide band of radiations to provide a graded degree of porosity which decreases as the distance from the exposed surface of said silica film increases, with the size of the largest pores in said silica layer being sufficiently small so as not to significantly scatter the radiations intended to be passed through said substrate.

* * * * *